Nov. 6, 1945.   C. E. SLAUGHTER   2,388,297
COMPOSITE ARTICLES INCLUDING EXTRUDED SECTIONS
Filed July 10, 1941   2 Sheets-Sheet 1
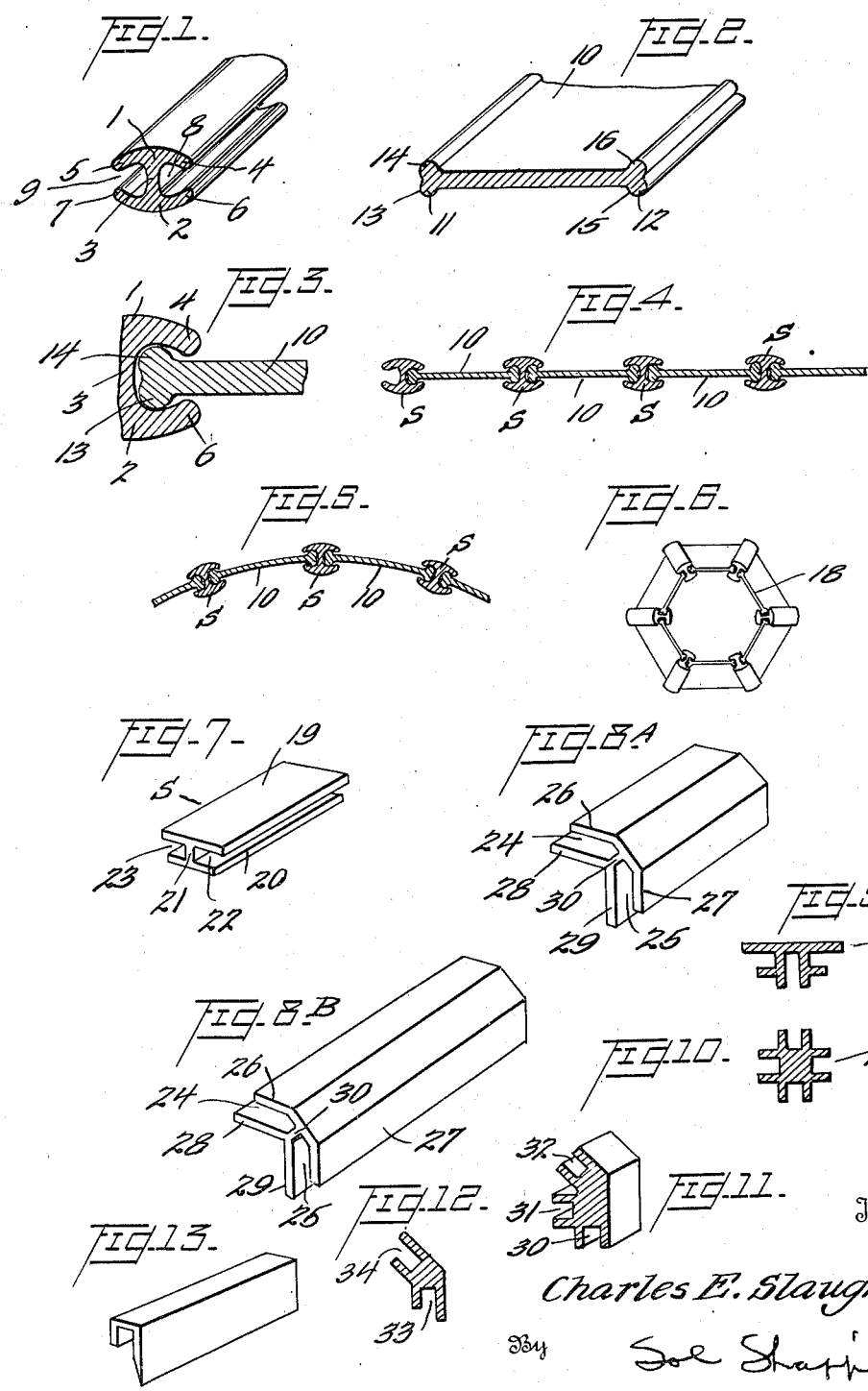
Inventor
Charles E. Slaughter,
By Sol Shapiro
Attorney

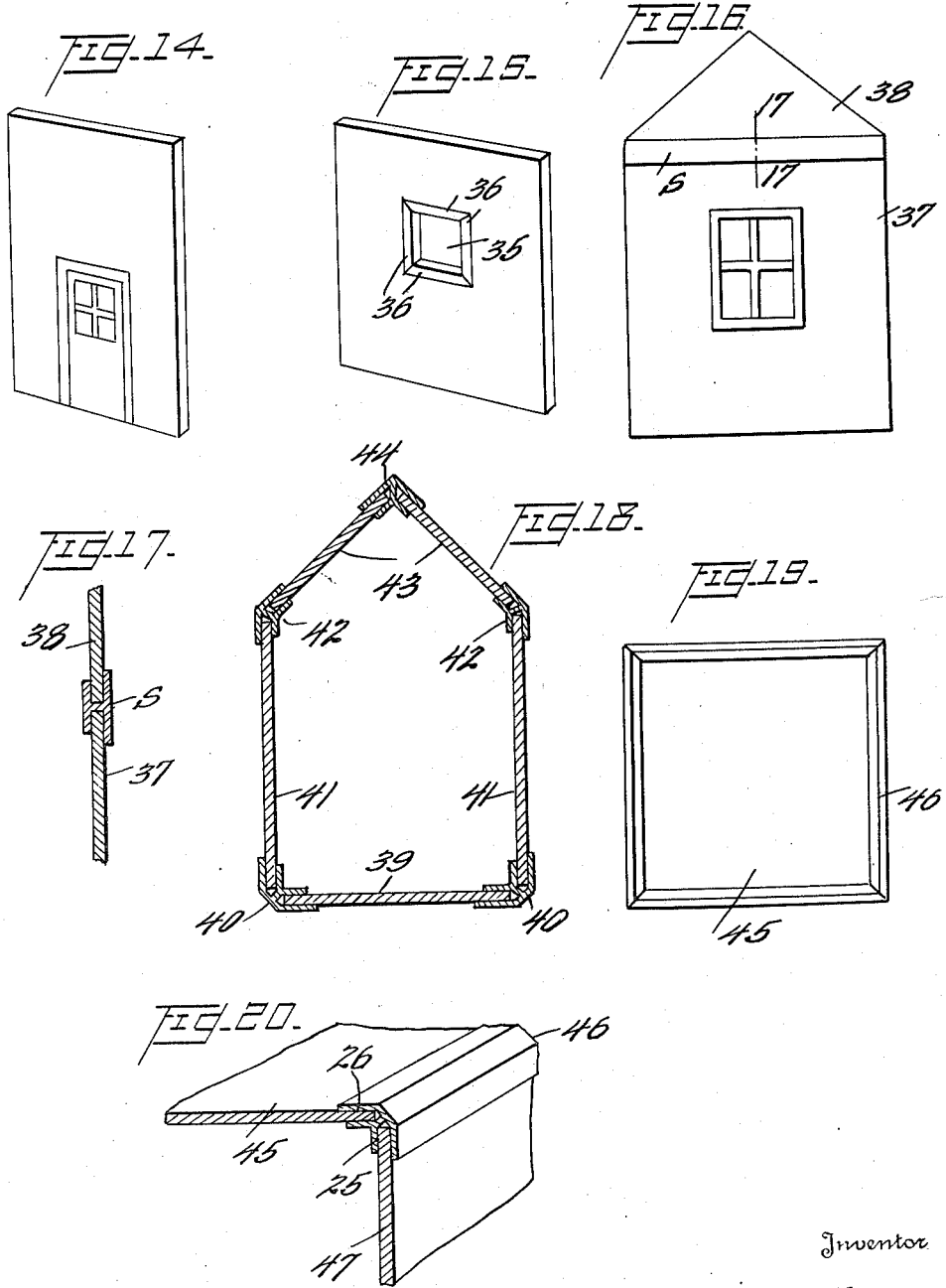

Patented Nov. 6, 1945

2,388,297

UNITED STATES PATENT OFFICE 2,388,297

COMPOSITE ARTICLE, INCLUDING EXTRUDED SECTIONS

Charles E. Slaughter, New Canaan, Conn., assignor to Extruded Plastics, Inc., Norwalk, Conn., a corporation of Connecticut Application July 10, 1941, Serial No. 401,881

7 Claims. (Cl. 154—42)

This invention relates to the production of composite articles, particularly utilizing extruded elements in building up unitary structures from smaller component parts.

The utilization of extruded material is limited in the prior art with respect to the width of products that can be extruded. At best, strips, ribbons or sheets of not more than a few inches width can be produced by prior art methods and the limitations imposed by extruding machines and operations. Consequently it is impossible to extrude wide sections of material.

Among the objects of the present invention is the production of wide sheets or forms of sheet material built up at least in part from extruded products.

Other objects include such composite products of relatively large dimension either in flat or curviform cross-section.

Still further objects include assemblies of units of extruded elements with sheet materials enabling assembly of the various units into elaborated structures.

Other objects and advantages of the present invention will appear from the more detailed description set forth below, it being understood, however, that this more detailed description is given by way of illustration and explanation only and not by way of limitation since various changes therein may be made by those skilled in the art without departing from the scope and spirit of the present invention.

In accordance with that more detailed description, there is shown in the accompanying drawings, in Figure 1, a perspective view of one form of extruded element; in Figure 2, a sheet element cooperating with the strip of Figure 1; in Figure 3, a section through the joint formed of the elements of Figures 1 and 2; in Figure 4, a section through a sheet of material built up from the elements of Figures 1 and 2; in Figure 5, a modified form of such sheet; in Figure 6, an article produced by the elements of Figures 1 and 2; in Figures 7-13, various forms of extruded strip material for use in the production of composite sheets; in Figures 14 and 15, modified forms of sheet elements for use with the forms of Figures 7-13; in Figure 16, a side elevation of a miniature house built with the elements of Figures 7-15; in Figure 17, a transverse section on the lines 17—17 of Figure 16; in Figure 18, a longitudinal section through the miniature house construction of Figure 16; in Figure 19, an elevation of a flat roof structure built with the elements of Figures 7-13; and in Figure 20, a detailed sectional view through one portion of the roof of Figure 19.

In accordance with the present invention, structures are built up from elements, a part of the elements employed being extruded products. The utilization of extruded plastic strips of varying contour enables the association of such strips with sheet elements so that composite sheets of any desired width or curvature may be produced as desired, and such elements may be utilized in the construction of miniature buildings and other structures.

Desirably the strip elements are of extruded plastic since they may be readily and economically produced and cut to varying lengths as desired for association with sheet elements. Such extruded strips which serve as the locking units between the sheet elements are desirably made from thermoplastic substances and may be, for example, any synthetic resins of the thermoplastic type, particularly cellulose derivatives such as the esters including cellulose acetates and cellulose acetobutyrates, and the ethers such as ethyl cellulose; polymerized vinyl materials and other resinous compositions that may be extruded in continuous lengths. The sheet elements may be of any desired material such as metal, cardboard, glass or plastic. More desirably the sheet elements are of plastic and may be extruded plastic up to the width permissible in extruding machines and thus utilized with the extruded strips to produce composite structures of decorative character. The extruded strips may be of any desired color since the thermoplastic substances may be dyed, tinted or pigmented in any desired way. The sheet elements, particularly when of plastic, may also be dyed, tinted or pigmented in any desired manner and when used conjointly with the extruded strips the color of the strips and of the elements may be made the same or any combination of color may be utilized for producing contrasting views or multitone colored articles.

It is thus possible to produce wide sections of thermoplastic materials either of homogeneous character or in two or more color combinations. When the composite articles are to be built entirely of plastics, the strips and sheet elements may be formed to produce joints that interlock and thus maintain the structure built therefrom, In Figure 1 there is shown one form of extruded strip desirably produced from thermoplastic resinous material having body portions 1, 2 joined by flange 3. The walls or edges 4, 5 and 6, 7 of the body members 1 and 2 define grooves or slots 8, 9 respectively, for reception of sheet material. In order that the sheet material may be gripped tightly, the walls or edges 4, 5 and 6, 7 are fixed so that the edges 4 and 6, and 5 and 7, respectively, approach each other and exert a gripping action on material placed in the groove. Desirably the distance between the ends of the walls 4, 6 and 5, 7 may be slightly less than the thickness of the sheet material to be placed therein so that the sheet material is gripped tightly.

In order to interlock sections when this is desired, the grooves or slots may be enlarged inwardly of the walls 4, 6 as shown in Figure 3 to form a channel guarded by the enlarged edges 4 and 6. The sheet element 10 may be formed with a bead at each side edge thereof as shown at 11, 12 to fit the channel of the strip. Thus knobular portions 13, 14 and 15, 16 may be formed in or as part of the beads 11, 12 to conform with the grooves 8 and 9, so that the beads may be snapped into position in the grooves to lock the parts together.

In Figure 4, a flat sheet is shown built up from a series of sheets 10, having beaded edges joined together by alternating extruded plastic strips S. The width of such sheet may be made as great as desired from relatively small sheet elements 10 and coacting strips S. In this way sections can be built up along the lines of Figure 4 to be used to great advantage, for example, in modern types of fluorescent lighting where in this way a satisfactory shade or curtain can be produced of the width desired. Or as shown in Figure 5, a sheet may be built up curviform in cross-section from curved sheets 17 joined by alternating strips S, S. In the latter event if desired, the curve can be closed by using the requisite number of sheets 17 and strips S to produce a cylindrical product. Or if the sheets are made trapezoidal in shape as shown at 18 in Figure 6, a number of such trapezoidal sheet elements 18 may be assembled with strips S to produce a closed structure such as a lamp shade. These composite structures may be built up without the interlocking features where the walls of the slots of the strips grip the sheet elements tightly or the interlocking features may be utilized. Furthermore, where the elements are of thermoplastic material, they may be readily welded together by the application of a slight degree of heat along the lines of contact. Or after being set to the desired shape, the interlocking sections may be welded permanently together by means of a suitable solvent for the plastic. For example, in the case of cellulose acetobutyrate, a small quantity of acetone may be applied in the channel portion of the interlocking section during assembly and the solvent action will serve to produce a permanent weld between the elements.

As shown in Figures 7–13, the extruded plastic strips may take a variety of forms to serve as decorative elements or for joining sheet elements at various angles. Thus, in Figure 7, the strip S has body portions 19 and 20 joined by flange 21 producing grooves or channels 22, 23 serving to hold sheet elements in substantially flat position so that in this way a larger sheet element may be built up with strips and small sheets of material. Or right angular joints may be used as illustrated in Figures 8A and 8B, the strips of these figures being of the same size but one being double the length of the other for purposes hereinafter set forth. In this case, the grooves 24, 25 are at right angles to each other formed by corresponding walls 26, 27 and 28, 29 joined by flange 30. Strips of this character are readily extruded in any desired color.

Figures 9 and 10 illustrate sections through extruded strips showing three and four grooves for association of three and four sheet elements respectively, the grooves being at 90° angles successively. In Figures 11 and 12, the grooves are shown angularly displaced with respect to one another, at angles, for example, of from 120° to 150°. Figure 11 shows three grooves, 30 and 31 being at right angles to each other while groove 32 may be at an angle of 45° to groove 31 and at an angle of 135° with respect to groove 30. In Figure 12, the two grooves 33 and 34 are shown at an angle which may be 150°. Figure 13 shows an extruded strip material with one groove which may be used as a decorative trim around the exposed edge or edges of sheet material. Any of the extruded shapes referred to may be readily produced. They may be extruded in continuous lengths and cut to the size desired. They may be of the same or different color and an assembly of such strips together with sheet elements may be utilized for building a variety of structures, as for example, miniature houses and buildings. For this purpose, a variety of extruded strips of various shapes as illustrated in Figures 7 to 13 may be employed in an assembly using such strips in a variety of lengths. The extruded strips may be relatively short as shown in Figure 11 and used only at the corners of the building or they may be produced in unitary lengths as shown in Figure 8A or in double lengths as shown in Figure 8B. When used in assemblies for the production of structures of such character as miniature buildings, they are desirably associated with flat sheet elements as illustrated in Figures 14 and 15. Such sheet elements may be decorated to illustrate windows or window openings or doorways. These sheet elements may be of any desired material as indicated above, but desirably are produced from plastic and may be extruded plastic. Figure 14 shows such a sheet element decorated to indicate a door, while Figure 15 shows a sheet element utilizable for the side wall of a building having window opening 35. Such window opening 35 may have its edges covered by trim of the character shown in Figure 13, the ends of such trim being cut at an angle of 45° so that they may be employed around the window opening 35 as shown at 36.

A house structure which may be built from such assembly of elements is illustrated in Figure 16, the side wall 37 being joined by strip S of the character shown in Figure 7, to a triangular sheet element 38. A transverse section through such a structure is illustrated in Figure 18 where a floor member 39 is joined by strip 40 of the character shown in Figure 8 to the wall member 41. The latter is connected through strip 42 of the character shown in Figure 12 to a sheet element 43 while the latter has the strip 44 forming the upper edge of the roof. The other side of the building would be produced in an analogous way.

A flat roof structure is illustrated in Figures 19 and 20 where the sheet 45 has its edges covered by strips 46 of the character shown in Figure 8, the ends of the strips being cut at 45° so that they may be joined as illustrated in Figure 19. The groove 25 of the strip 46 holds the side wall 47 in position while the roof sheet element 45 is held in the groove 26 of the strip element 46.

It is apparent that construction assembly kits may be produced with any desired grouping of extruded strips of the character set forth above, and coacting sheet elements enabling the construction of buildings, houses, etc.

If the sheet elements are produced from transparent plastic material, such assemblies of elements may be utilized by interior decorators to simulate rooms in which miniature furniture may be arranged to give a visualization of a projected interior.

Sets of such assemblies of strips and sheets may be sold as entities for the construction of various types of structures or articles, making a variety of combinations possible. They are practically indestructible and sections may be added as desired. The natural elasticity of the plastic is sufficient to hold the elements together into substantially rigid structures which may be disassembled at will. The strip or sheet material may be decorated or printed in any desired way for simulation of particular objects.

Having thus set forth my invention, I claim:

1. A composite plastic article of extended area produced from plastic strips of a width of the order of not more than a few inches, said article comprising an extruded, synthetic resinous, plastic, substantially flat sheet having a beaded edge, and an extruded, synthetic resinous, thermoplastic, substantially flat strip having along an edge thereof, curved flexed walls defining a groove to receive said beaded edge, the beaded edge being gripped within the groove by the flexed side walls to hold the strips together.

2. An article as set forth in claim 1, in which the material of the walls forming the groove and of the bead are self-welded together at the line of contact.

3. An article as set forth in claim 1, in which the material of the walls forming the groove and of the bead are self-welded together by heat at the line of contact.

4. An article as set forth in claim 1, in which the material of the walls forming the groove and of the bead are self-welded together by solvent action at the line of contact.

5. The method of forming composite plastic articles of extended area from plastic strips of a width of the order of not more than a few inches, which comprises inserting a synthetic resinous, plastic, substantially flat sheet having a beaded edge into an extruded, synthetic resinous, thermoplastic, substantially flat strip having along an edge thereof, flexed walls defining a groove to receive said beaded edge, with the bead gripped within said groove by pressure exerted by said flexed walls, and self-welding the material of the plastic strips together at the line of contact.

6. A method as set forth in claim 5, in which the material is welded together by heat.

7. A method as set forth in claim 5, in which the material is welded together by solvent action.

CHARLES E. SLAUGHTER.